(No Model.)

G. W. ALEXANDER.
FENCE.

No. 422,684. Patented Mar. 4, 1890.

WITNESSES:
Fred G. Dieterich
M. D. Blondel

INVENTOR:
G. W. Alexander.
BY Munn & Co.
ATTORNEYS

UNITED STATES PATENT OFFICE.

GEORGE W. ALEXANDER, OF HOLLY SPRINGS, LOUISIANA.

FENCE.

SPECIFICATION forming part of Letters Patent No. 422,684, dated March 4, 1890.

Application filed October 23, 1889. Serial No. 327,961. (No model.)

*To all whom it may concern:*

Be it known that I, GEORGE W. ALEXANDER, of Holly Springs, in the parish of Claiborne and State of Louisiana, have invented a new and useful Improvement in Fences, of which the following is a specification.

My invention consists in a new and improved fence, which will be hereinafter fully described and claimed.

Figure 1:
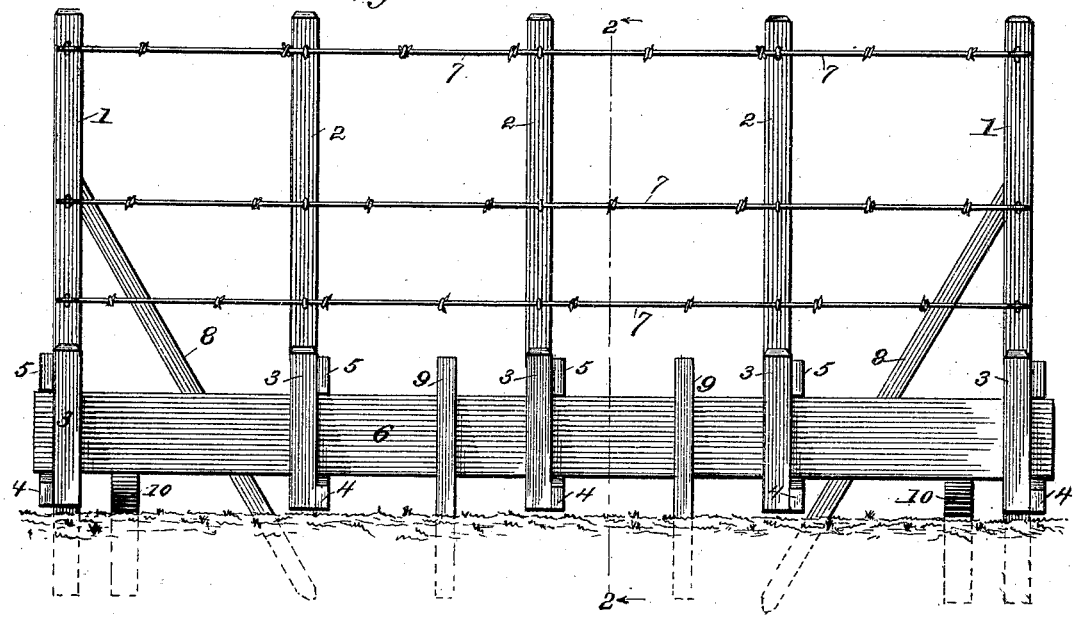
Figure 2:
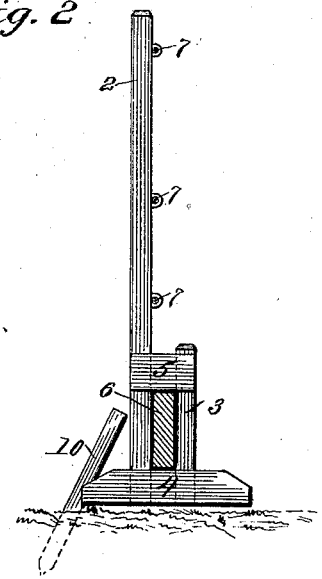

Referring to the accompanying drawings, Figure 1 is a side view of my improved fence; and Fig. 2 is a section on line 2 2, Fig. 1.

The same numerals of reference indicate corresponding parts in both the figures.

Referring to the several parts by their designating numerals, 1 1 indicate the end posts, which are placed one at each end of the panels of my new and improved fence. These end posts have their lower ends set firmly in the ground, and are the only parts of my fence that enter the ground.

2 2 indicate the vertical main posts between the end posts 1, being three in number in the drawings. The lower ends of these main posts 2 do not enter the ground at all, but are cut off square above the surface of the ground.

By the side of the tall main posts 1 2 are placed short vertical posts 3, the lower ends of which are free above and do not enter the ground. To the lower ends of each main post 1 2 and its adjacent short post 3 is secured a horizontal cross piece or bar 4, the lower edge of which is in close proximity to but does not enter the ground. The upper end of each short post 3 is connected to its adjacent main post by a short upper cross-piece 5, the posts 3 being secured to the cross-bars at such a distance from the main posts as to leave sufficient space between them for the admission of a plank 6 or rails, which may be used in place of this plank.

In between the main posts 1 2 and the short posts 3, and between the lower and upper cross-bars 4 5, is slipped a plank 6, which is not nailed or otherwise secured in any way, and which serves to make the fence hog-proof, effectually preventing pigs, hogs, &c., from getting through the fence. Above the plank 6 barbed wires 7 are stretched and secured to the main posts 1 2 by staples. The number of barbed wires used may be varied, and they serve to prevent stock from breaking down the fence. The end posts are braced by inclined braces 8, as shown. By the side of the planks 6, I place, when required, fixed stakes 9, which protect the fence from being damaged by high water in sections where it is liable to such injury. By the lower part of the fence I place inclined posts 10, which prevent wagons from running against the fence.

From the foregoing description, taken in connection with the accompanying drawings, the construction of my new and improved fence will be readily understood. It will be seen that the great feature of my invention is that all the main posts 2, the short posts 3, and the cross-bars are all above the ground, and do not enter the ground, the end posts being the only parts that enter the ground. Now all the parts of a wooden fence that enter the ground will inevitably rot off, and as all the parts of my fence except the end posts are above the ground, and do not enter the ground they will not rot off. My fence will thus last far longer and be far more durable than any other in use. It will also save digging post-holes, and is cheaper and will require less time to manufacture.

In constructing my fence I can use old or new rails and can utilize old or partly-worn rails, as my main posts are shorter and do not require to enter the ground. The planks 6 are placed in loose and are not nailed, and it will thus be seen that short planks or rails can be used by placing the posts nearer together or farther apart, and the time and cost required in building a fence are greatly reduced.

Having thus described my invention, what I claim, and desire to secure by Letters Patent, is—

1. In a fence, the combination of the fixed end posts 1, the intermediate main posts 2, the lower ends of which terminate above the ground, the short posts 3, having the free lower ends, the lower and upper cross-bars securing the short posts at the side of the main posts 1 2, and the plank 6, substantially as set forth.

2. In a fence, the combination of the fixed end posts 1, the intermediate main posts 2, having the free lower ends, the short posts 3, having the free lower ends, the lower and upper cross-bars securing the short posts at the side of the main posts 1 2, the plank 6, and the barbed wires secured to the main posts above the plank 6, substantially as set forth.

3. The combination of the fixed end posts 1, the intermediate main posts 2, having the free lower ends, the short posts 3, having the free lower ends, the connecting cross-bars 4 5, the plank 6, and wires 7, and the fixed stakes 9 at the side of the plank 6, substantially as set forth.

GEORGE W. ALEXANDER.

Witnesses:
W. F. BRIDGES,
J. E. MOORE.